(No Model.) 2 Sheets—Sheet 1.
P. W. A. PAASCH.
ADJUSTABLE REFLECTOR.
No. 519,589. Patented May 8, 1894.
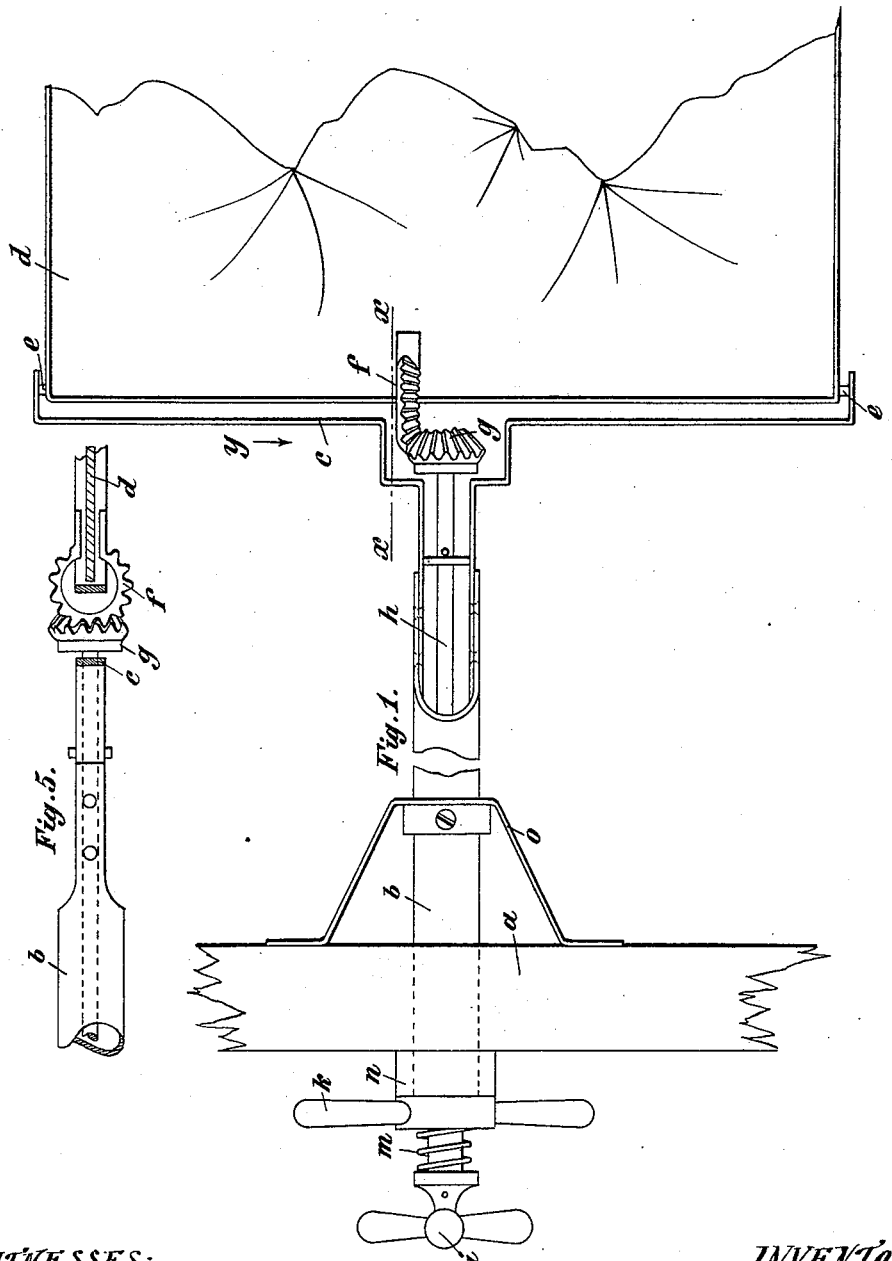
WITNESSES:
INVENTOR (No Model.) 2 Sheets—Sheet 2.
P. W. A. PAASCH.
ADJUSTABLE REFLECTOR.
No. 519,589. Patented May 8, 1894.
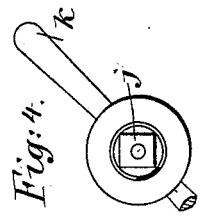
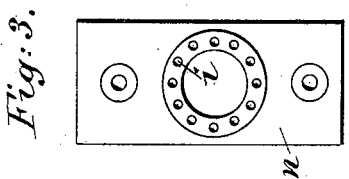
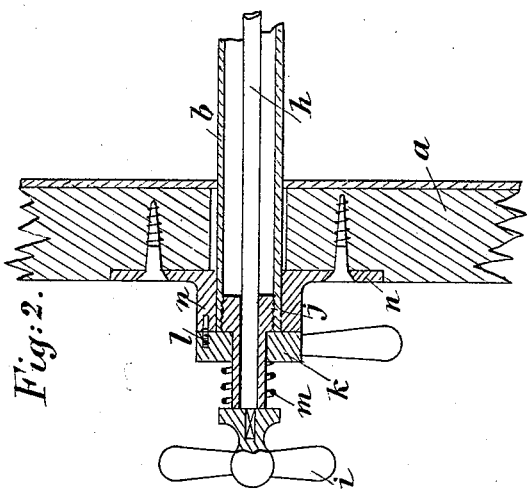
WITNESSES:
INVENTOR
ATTORNEYS.

UNITED STATES PATENT OFFICE.

PETER WILHELM ADOLF PAASCH, OF HAMBURG, GERMANY.

ADJUSTABLE REFLECTOR.

SPECIFICATION forming part of Letters Patent No. 519,589, dated May 8, 1894.

Application filed November 29, 1893. Serial No. 492,347. (No model.)

*To all whom it may concern:*

Be it known that I, PETER WILHELM ADOLF PAASCH, a subject of the German Emperor, residing in Hamburg, Germany, have invented new and useful Improvements in Adjustable Reflectors, of which the following is a specification.

This invention relates to apparatus enabling dwellers in houses to observe at will all that occurs in the street or road, from any part or story of the building, without the necessity of putting their heads out of the windows; and what particularly enhances the value of the invention is that its object is accomplished by one single reflector or mirror only, instead of by the employment of a number of mirrors adjustable in relation to each other; such single mirror being adapted to assume any position which the attainment of its purpose may require.

The invention will be best understood by reference to the accompanying drawings, in which—

Figure 1 is a plan. Fig. 2 is a longitudinal section of the mirror adjusting mechanism. Figs. 3 and 4 are detail views and Fig. 5 is a section on line $x$—$x$, Fig. 1, the arrangement being viewed in the direction of the arrow $y$.

Similar letters of reference indicate like parts in all the views.

Through the window frame $a$ is passed a guiding-tube or sleeve $b$, to which are secured the oppositely disposed arms $c$ which form the supporting-frame of the reflecting mirror $d$. The attachment of the mirror $d$ to the said supporting-frame $c$ is effected by means of two aligned bolts or pins $e$, on which the mirror is adapted to turn in one direction. As it is necessary to vary the angle of inclination of the mirror, depending on the distance at which the object observed may be from the point of observation, a bevel wheel or toothed segment $f$ is attached to the edge of the mirror. This bevel-wheel $f$ is engaged by a small wheel or pinion $g$ mounted upon the spindle $h$, which extends through and has suitable bearings in the guiding-tube or sleeve $b$. The inner edge of said spindle projects into the apartment, where, on emerging from the said sleeve, it terminates in a handle $i$.

Provided the sleeve or tube $b$ is stationary, it will be readily understood that it is only necessary to turn the handle $i$ in the required direction and to the desired extent, to change accordingly the position or angle of the mirror, thereby adjusting it in the manner best suited to the observation of a given point. Now, to retain the said tube $b$ reliably in position, and prevent its axial rotation it is provided, at the end which projects into the interior of the house with a square portion $j$ (Figs. 2 and 4), to which a collar or key $k$ is fitted. This key, moreover, carries pins such as $l$ (Fig. 2) which are constantly forced, by a spring $m$, confined between said key and the handle $i$, into corresponding recesses $i'$ provided in the fitting $n$, attached to the inner side of the window-frame whereby the tube or sleeve $b$ is made stationary throughout. In addition to this, however, the said tube is passed through another bracket or carrier $o$ on the outside of the window-frame $a$, which assists in supporting it.

Supposing now it is desired to place the mirror at right angles to the direction of the motion produced by the bevel-gearing $g$ and $f$, it is then only necessary to raise the key $k$ and thereby to remove the pins $l$ from the recesses $n$. When this is done, the tube or sleeve $b$ and with it the mirror may readily be turned at right angles to the adjustment permitted by pins $e$; and when the mirror has thus been properly adjusted, the key $k$ may be locked in position again by allowing its pins to re-enter the openings in the fitting $n$ (Fig. 3).

Having thus described my invention, I claim as new and desire to secure by Letters Patent—

1. The combination, with a fitting adapted to be attached to a window-frame, of a rotatable tube mounted therein a frame carried by the tube, a mirror pivoted in said frame and adapted to be turned in one direction by said tube, and means extending through said tube for turning the mirror in another direction on its pivot, substantially as set forth.

2. The combination, with a fitting adapted to be attached to a window-frame, of a rotatable tube mounted therein, a key for locking said tube against rotation, a frame carried by the tube, a mirror pivoted in said frame and adapted to be turned in one direction by said tube, a spindle located in said tube, and suitable gearing connecting the spindle and mirror for turning the latter in another direction on its pivot, substantially as set forth.

3. The combination, with a fitting adapted to be attached to a window-frame, of a rotatable tube mounted therein, a frame carried by the tube, a mirror pivoted in said frame and adapted to be turned in one direction by said tube a spindle located in said tube and provided with a bevel-gear wheel at one end, and a bevel-gear on the mirror intermeshing with said wheel, whereby the mirror may be turned on its pivot in another direction, substantially as set forth.

4. The combination, with a fitting provided with a series of holes and adapted to be attached to a window-frame, of a rotatable tube mounted therein, and having an irregular or square portion, a frame carried by the tube, a mirror pivoted in said frame and adapted to be turned in one direction by said tube, a movable key on said irregular portion of the tube, provided with a pin adapted to enter said holes and lock the tube against rotation, and means for turning the mirror in another direction on its pivot, substantially as set forth.

5. The combination, with a fitting provided with a series of holes and adapted to be attached to a window-frame, of a rotatable tube mounted therein, a frame carried by the tube, a mirror pivoted in said frame and adapted to be turned in one direction by said tube, a nonrotary sliding key on the tube provided with a pin adapted to enter said holes and lock the tube against rotation, a spindle located in the tube and provided with a handle at one end, and gearing connecting the other end of the spindle with said mirror, whereby the latter may be turned in another direction on its pivot, substantially as set forth.

In witness whereof I have hereunto set my hand in presence of two witnesses.

PETER WILHELM ADOLF PAASCH.

Witnesses:
PAUL FISCHER,
ROBERT MAULIGAUR.